US006368092B1

(12) United States Patent
Lindee et al.

(10) Patent No.: US 6,368,092 B1
(45) Date of Patent: Apr. 9, 2002

(54) KNOCK-OUT SYSTEM FOR PATTY MOLDING MACHINE

(75) Inventors: Scott A. Lindee, Mokena; Glenn Sandberg, Lockport, both of IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 09/326,085

(22) Filed: Jun. 4, 1999

Related U.S. Application Data
(60) Provisional application No. 60/088,243, filed on Jun. 5, 1998.

(51) Int. Cl.[7] .................................................. A23P 1/10
(52) U.S. Cl. ....................... 425/107; 425/556; 425/575; 426/513
(58) Field of Search ................................ 425/107, 556, 425/574, 575, 225; 426/512, 513

(56) References Cited

U.S. PATENT DOCUMENTS

| | | | |
|---|---|---|---|
| 3,053,529 A | | 9/1962 | Dunn ............................ 271/11 |
| 3,866,741 A | * | 2/1975 | Carbon et al. ............... 414/789 |
| 3,887,964 A | * | 6/1975 | Richards ...................... 425/251 |
| 3,946,117 A | | 3/1976 | Blair et al. ................... 426/513 |
| 3,952,478 A | | 4/1976 | Richards et al. .............. 53/122 |
| 4,054,967 A | | 10/1977 | Sandberg et al. ............ 426/512 |
| 4,081,564 A | | 3/1978 | Borsuk ......................... 426/513 |
| 4,182,003 A | | 1/1980 | Lamartino et al. ........... 425/566 |
| 4,329,828 A | | 5/1982 | Wagner ........................ 426/513 |
| 4,541,143 A | | 9/1985 | Holly ........................... 426/513 |
| 4,608,731 A | | 9/1986 | Holly ........................... 426/513 |
| 4,768,260 A | * | 9/1988 | Sandberg ...................... 425/556 |
| 4,768,325 A | * | 9/1988 | Lindee et al. ................. 53/122 |
| 4,996,743 A | * | 3/1991 | Janssen ......................... 425/579 |
| 5,655,436 A | * | 8/1997 | Soper ............................ 425/556 |
| 5,980,228 A | * | 11/1999 | Soper ............................ 426/512 |

OTHER PUBLICATIONS

Formax, Inc., FORMAX 12 (6 pages)—No Date.

* cited by examiner

Primary Examiner—Nam Nguyen
Assistant Examiner—Thu Khanh T. Nguyen
(74) Attorney, Agent, or Firm—Rockey, Milnamow & Katz, Ltd.

(57) ABSTRACT

A patty forming machine includes a mechanical compartment having a front wall and surrounding a reciprocating device, a reciprocating mold plate having cavities for forming patties, and a reciprocating knock-out device for knocking the patties from the mold plate. The knock-out device includes vertically reciprocating knock-out rods, knock-out bar arms connected to the knock-out rods, a bar connected to the knock-out bar arms, and a plurality of cups connected to the bar. The knock-out rods are guided both above and below the knock-out bar arms for vertical reciprocating movement. The knock-out rods are connected together by a tie rod and clamp blocks located at opposite ends of the tie bar. The knock-out rods are driven into vertical reciprocation by knock-out arms which are driven to pivot by rotating cams. Located adjacent to each of the cams is an oil reservoir which is substantially sealed except for being penetrated by two wicks, one of the wicks being used to transport oil to the pivotal connection of the respective knock-out arm, and respective other of the wicks arranged to transport oil to the cam surface which drives the knock-out arm.

17 Claims, 16 Drawing Sheets

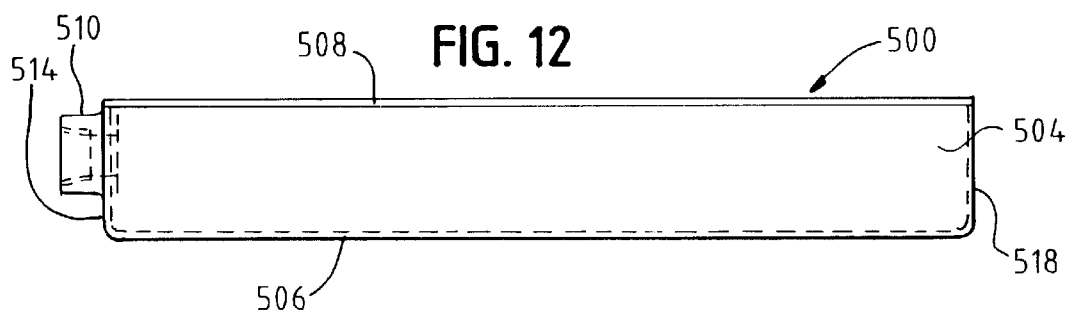
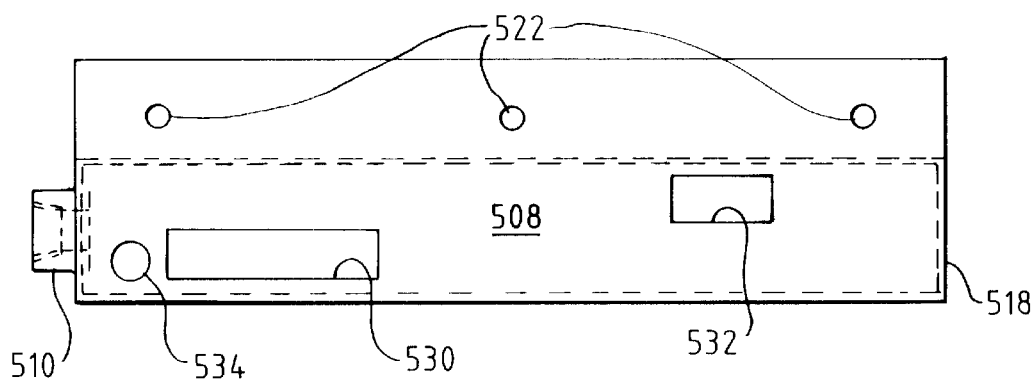
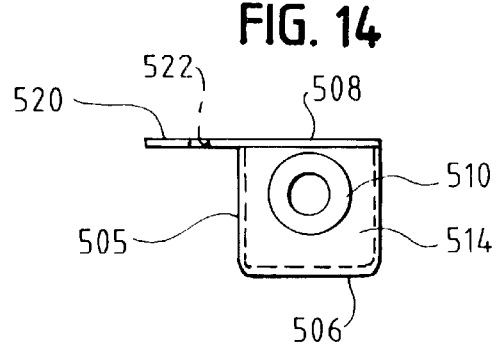

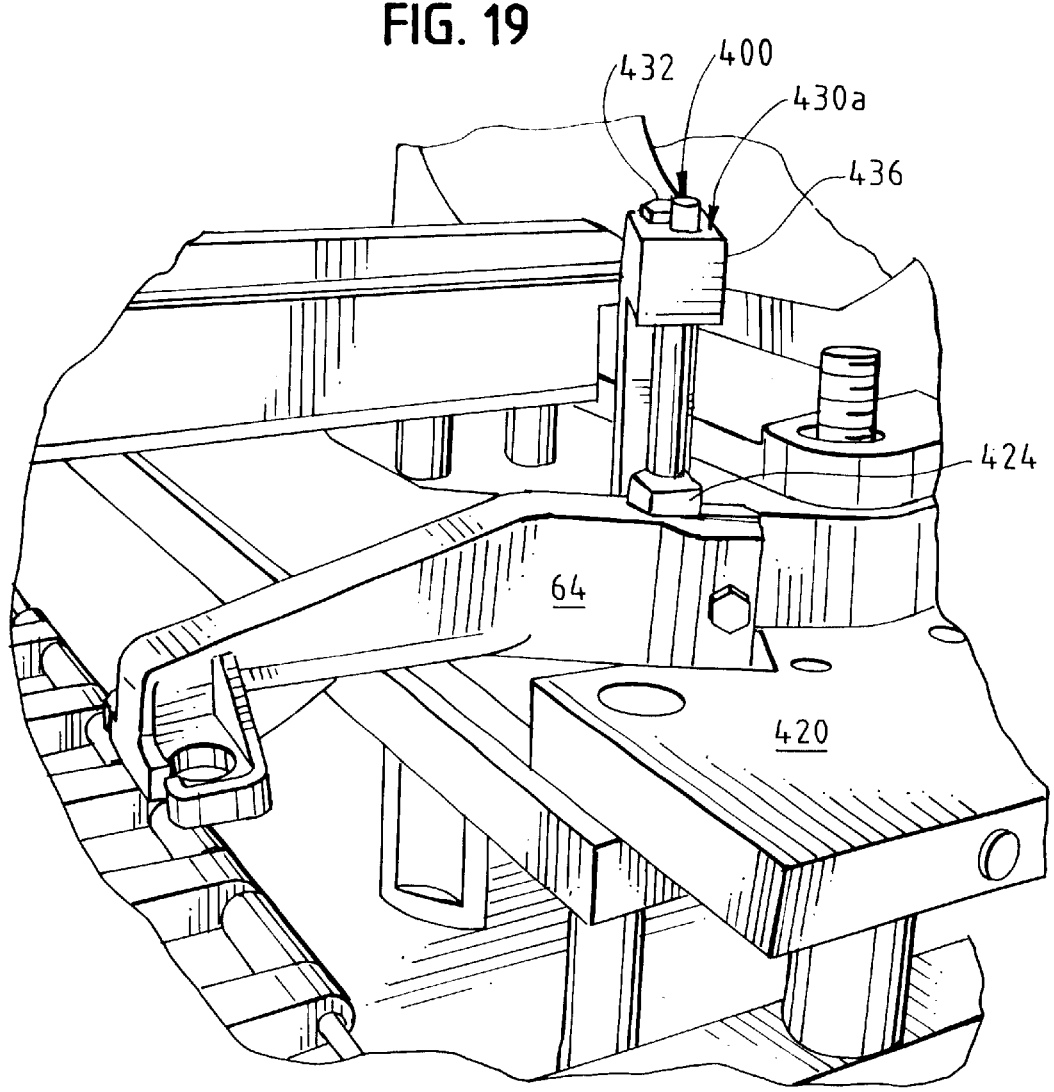

KNOCK-OUT SYSTEM FOR PATTY MOLDING MACHINE

This application is a non-provisional application claiming benefit of prior filed provisional application U.S. Ser. No. 60/088,243 filed Jun. 5, 1998.

STATEMENT REGARDING FEDERALLY SPONSORED RESEARCH OR DEVELOPMENT

Not Applicable

BACKGROUND OF THE INVENTION

The present invention is directed to a food patty molding machine and in particular to improvements in the operating structure of a known food patty molding machine such as described in FIGS. 1 through 8B.

A FORMAX-12 brand food patty molding or forming machine 30 manufactured by Formax, Inc., of Mokena, Ill., U.S.A. is shown in FIGS. 1–8B. The operation of the machine is generally described in U.S. Pat. Nos. 4,182,003; 4,054,967; and 3,952,478, herein incorporated by reference.

This machine includes a sheet metal housing 34 which encloses the mechanical equipment of the machine. The housing is supported on wheels 35a and/or leveling legs 35b. A hopper 36 is situated at an elevated position on the machine. The hopper includes an open top 40 for receiving bulk food products, for example, whole muscle chicken or ground beef. A pair of feed screws within the hopper (not shown) drives the food product into a pump box area 44 where a reciprocating pump 45 (FIG. 2) presses the food product into mold cavities 46 (shown in FIG. 9) of a reciprocating mold plate 47. The mold plate is reciprocated out of the pump box area to a knock-out area 50 where knock-out cups 52 push the formed meat product or patties out of the cavities and onto a conveyer 56 (FIG. 2). A paper placing station 58 includes mechanisms to interleave paper between patties during the dropping of the patties onto the conveyor.

FIG. 2 illustrates the machine of FIG. 1 with an access door 57 open. The knock-out cups 52 are held on a horizontal bar 60 which is supported by two spaced apart knock-out bar arms 64. The knock-out bar arms 64 are clamped to two vertical, reciprocating knock-out rods 70. The rods 70 are journaled or supported at positions 71a on a mold cover 71 below the knock-out bar arms 64. Because the rods 70 can have a substantial unsupported or unguided length above the position 71a, high bending stress can be realized in the rod 70.

As shown more clearly in FIG. 6, the rods 70 are driven by the rotation of cams 72 which are mounted on a cam shaft 73 rotationally mounted to the machine frame. The cam shaft 73 is driven to rotate by a sprocket 74. The sprocket is driven by a drive chain 75, which is driven by the power train of the machine.

The cams 72 have cut-out, flat regions 78. Knock-out arms 79 are pivotally connected to the machine frame at a bolt or axle or pivoting connection 79a and have arcuate ends 80 which slide along the rotating cam surface 84. When the ends 80 reach the cut out, flat regions 78 of the cams, the knock-out arms 79 rotate downwardly in the direction R, and then rotate upwardly in a reverse direction when the flat regions 78 have passed. Thus, rotation of the cams 84 causes an up and down pivoting of the knock-out arms 79 about the connection 79a. An opposite end 90 of each of the knock-out arms is connected to one knock-out rod 70 by a bolted linkage 92 and by a bolt 94. Extending outwardly from each rod 70 is a flag or lug 96 having a hole for receiving a machine screw 98 which is threaded into one of two opposite ends of a spacer rod or tie rod 100. The flag 96 is possibly subjected to high bending or twisting forces during operation and can possibly be subject to cracking due to fatigue.

An oil pan 101 is located beneath each cam 72. One will be described, the respective other is mirror image identical. A front wick 102 made of a woven, sponge or other wick material, is located at the pivoting connection 79a, held in place by a washer 102a to continuously oil the pivoting connection 79a. A rear wick 103 is held against the cam surface 84 to continuously oil the interface between the region 78 and the end 80 of the knock-out arm 79. The pan has an open top 104 into which the wicks 102, 103 are dipped. The pan 101 holds a supply of oil 105. It can possibly be a maintenance problem that sprayed wash water inadvertently enters the open top 104 of the pan 101 and contaminates or otherwise washes out the oil.

Each bolted linkage 92 is also connected by a bolt 95a to a vertical leg 95b of a movable plate 95. The plate is held within a guide frame 97 which is mounted by machine screws to a stationary part of the machine frame, at a top of the frame 97. Two springs 95d are mounted between an upper wall of the frame and a bottom leg 95c of the plate and resist the upward lifting of the plate within the frame. The springs are therefore the driving downward force generator of the knock-out operation. In FIG. 4D the springs are shown compressed with the knock-out rod lifted by the associated cam 72. In FIG. 6, the springs are expanded, and the knock-out rods have been driven to their downward position.

The knock-out bar arms 64 are mounted to top ends of the rods 70. The bar arms 64 are each fixed vertically to a rod by a top fastener 64a and rotationally by a clamp arrangement 64b closed by a horizontal fastener 64c. The bar arms 64 are fastened by bolts or machine screws to the horizontal bar 60 which holds the knock-out cups 52. Depending on the product being formed the bar 60 and cups 52 can have a different shape, and/or the bar can carry different number of cups.

Also shown in FIG. 2 is a vacuum bar assembly 106 which reciprocates during operation of the machine as part of a vacuum transfer shuttle or vacuum bar assembly for interleaving flexible paper sheets with formed patties as described in U.S. Pat. Nos. 3,952,478; 4,182,003; or 4,054,967. Also included is a paper placer assembly 107 which places the flexible paper sheets onto the vacuum bar assembly. Both the vacuum bar assembly and the paper placer assembly are driven by reciprocal motion of rods, i.e., by vacuum bar rods 108, 108a (see FIG. 8B) having a square cross section, and by a paper placer drive rod 110 having a round cross section, respectively.

FIG. 3 illustrates the reciprocating mold plate 47 connected via a hinge assembly 120 to a drive plate or slide plate 124. The drive plate 124 has an elongate rectangular cross section. The drive plate 124, the vacuum bar drive rod 108 and the paper placer drive rod 110 must all penetrate through, and reciprocate through the penetration of, a front wall or skin 130 which separates the food forming front section of the machine from the mechanical compartment. For sanitary reasons, at each penetration a sealing element is provided. The drive plate 124 requires a rectangular sealing element 140 bolted to the skin 130. A similar rectangular seal 144 must be provided at the vacuum rod drive bar 108 as it penetrates the skin 130. A circular seal 145 can be used at the paper placer drive rod 110 where it penetrates the skin 130.

FIG. 4A shows the vacuum bar drive rod or shuttle arm 108 penetrating the skin or wall 130. The rod 108 is connected via an intermediate plate 150 to a rack 152. The rack 152 is driven to reciprocate by a pinion 154.

FIGS. 8A and 8B show the arrangement of the vacuum bar drive rod 108 in more detail. The rack 152 is slidably held in a channel 153. It is to be noted that there are two drive rods 108, 108a arranged on a right side and a left side of the machine respectively. Each of the rods 108, 108a is connected to a rack and driven by a pinion 154 as shown in FIG. 8A. Each of the rods 108, 108a is connected to one lateral side of the vacuum bar 106 by two machine screws or bolts 156. The rods 108 pass through bearing blocks 160, 160a respectively before being connected to the vacuum bar 106. A paper placer drive sprocket 160 rotates a paper placer drive shaft 162 which rotates a paper placer crank arm 163 (shown in FIG. 4C) which drives the paper placer drive rod (via linkages) to reciprocate. The crank arm rotates about a horizontal axis of the drive shaft.

Returning to FIGS. 4A and 4B, the main drive motor 170 is shown driving a drive motor pulley 172 which drives a drive belt 174. The drive belt 174 drives a reducer pulley 176 which inputs rotational power to a mold plate drive reducer 180 (see FIG. 5). A reducer output shaft 182 outputs rotational power from the reducer 180. Sprockets and pulleys which are fixed to the output shaft 182 drive various systems including the drive chain 75 for actuating the knock-out rods 70, and a drive chain 185 for the paper placer sprocket 160. A hydraulic oil tank 186 is located at a front bottom portion of the machine. A rear output shaft of the main drive motor 170 drives a hydraulic pump 187 which powers the hydraulic systems of the machine. Also shown in FIG. 4B is a bottom skin or floor 188 which is located at an elevation equal to a bottom 190 of a bottom horizontal frame member 192. The bottom skin 188 substantially covers a bottom of the machine.

FIG. 5 illustrates that the drive system for the mold plate includes a long rocker arm 200 which is connected by a slide plate linkage 202 to the slide plate or drive plate 124. Laterally arranged slide bearings 206a, 206b receive lateral edges of the slide plate 124 and guide the reciprocating movement of the slide plate 124 therein. The lateral bearings 206a, 206b are fixed to the machine overhead structure. Also shown is a feed screw gear box 210 for driving the feed screws within the hopper 40. A cabinet blower 211 driven by a motor 212 is used to circulate cooling air or purge air through the housing 34.

FIG. 7 shows the drive for the molding plate 47 in more detail. The hinge assembly 120 includes fixed hinge plates 214a, 214b holding a hinge axle 216 upon which are mounted hinged grippers 218a, 218b. The axle 216 allows a degree of pivoting between the fixed hinge plates 214a, 214b and the grippers 218a, 218b respectively. The hinged grippers 218a, 218b include bottom jaws 219a, 219b which are fixed to the upper jaws by machine screws 220, but when the bottom jaws 219a, 219b are released by unscrewing of the machine screws 220, they can pivot downwardly about the axle 216 to allow downward removal of the mold plate 47. The mold plate 47 is provided with holes for allowing passage of the machine screws 220. The hinge plates 214a, 214b are fixed to the slide plate 124 by machine screws 224 which pass through the slide plate 124 and are received into threaded holes in an underlying part of the hinge plates 214a, 214b respectively.

The slide plate linkage 202 includes an adjustable female rod end 230 connected to a clevis 232 which is fixed to the slide plate 124 via a machine screw 236 which is threaded into an underlying part of the U-shaped clevis. The slide plate 124 includes a hole for receiving the machine screw 236. A bolt 238 connects the clevis 232 with an eye-bolt of the female rod end 230. This allows pivoting about the horizontal between the clevis 232 and the female rod end 230. A male rod end 240 is threaded into the female rod end 230 and includes an eye-bolt end 242 for receiving a bolt 246 to allow relative pivoting about the horizontal axis between the male rod end 240 and the long rocker arm 200. A short rocker arm 256 is fixed to the long rocker arm 200 by a shear pin 250 via a shaft 254. The short rocker arm 256 includes an adjustable follower 260 which rides in a shaped cam channel 266 formed in the mold plate drive cam 270. The mold plate drive cam 270 is driven in rotation by the mold plate drive reducer 180 (shown in FIG. 5). The interaction between the short rocker arm, the cam 270 and the long rocker arm causes back and forth reciprocation of the slide plate 124, and thus the mold plate 47.

The inventors have recognized that it would be advantageous to provide an improved patty forming machine, which reduces bending or twisting forces on the knock-out rods and which prevents to a great extent the contamination or washout of oil from reservoirs which serve for the lubrication of the knock-out cams and knock-out arm pivot connections to the machine frame.

SUMMARY OF THE INVENTION

The invention provides an improved patty forming machine. Particularly, the invention includes an improved knock-out apparatus for pushing formed food products or patties from mold plates. The apparatus includes improved knock-out rods having improved upper knock-out rod supports which reduce bending stress on the knock-out rods. The upper knock-out rod supports are inverted L-shaped supports each having a sleeve bearing in an overhang portion to guide a top extension of a knock-out rod inserted therein. The knock-out bar arm is located below the sleeve bearing.

The apparatus includes an improved spacer rod or tie rod attachment structure connected to the two knock-out rods to reduce fatigue failure at the connection location. The improved structure includes a pair of clamp blocks each of which clamps one of the knock-out rods around its circumference. The clamp blocks are fastened together by a spacer rod. The use of a unitary flag or lug used in the prior art knock-out rod is avoided.

The apparatus also includes an improved oiling system for the knock-out cam and pivot connection bearing surfaces. The oiling system includes two substantially enclosed reservoirs each having openings for receiving a wick for each of the cam surface and the pivot connection of the knock-out arm located at each side of the machine, respectively.

Numerous other advantages and features of the present invention will become readily apparent from the following detailed description of the invention and the embodiments thereof, and from the accompanying drawings in which details of the invention are fully and completely disclosed as part of this specification.

BRIEF DESCRIPTION OF THE DRAWINGS

FIG. 12 is a left side view of an oil pan shown in FIG. 9;

FIG. 13 is a top plane view of the oil pan shown in FIG. 12;

FIG. 14 is an end view of the oil pan shown in FIG. 12;

FIG. 19 is a perspective view of the knock-out bar arm and supporting assembly shown in FIG. 9.

DETAILED DESCRIPTION OF THE PREFERRED EMBODIMENTS

Figure 1:
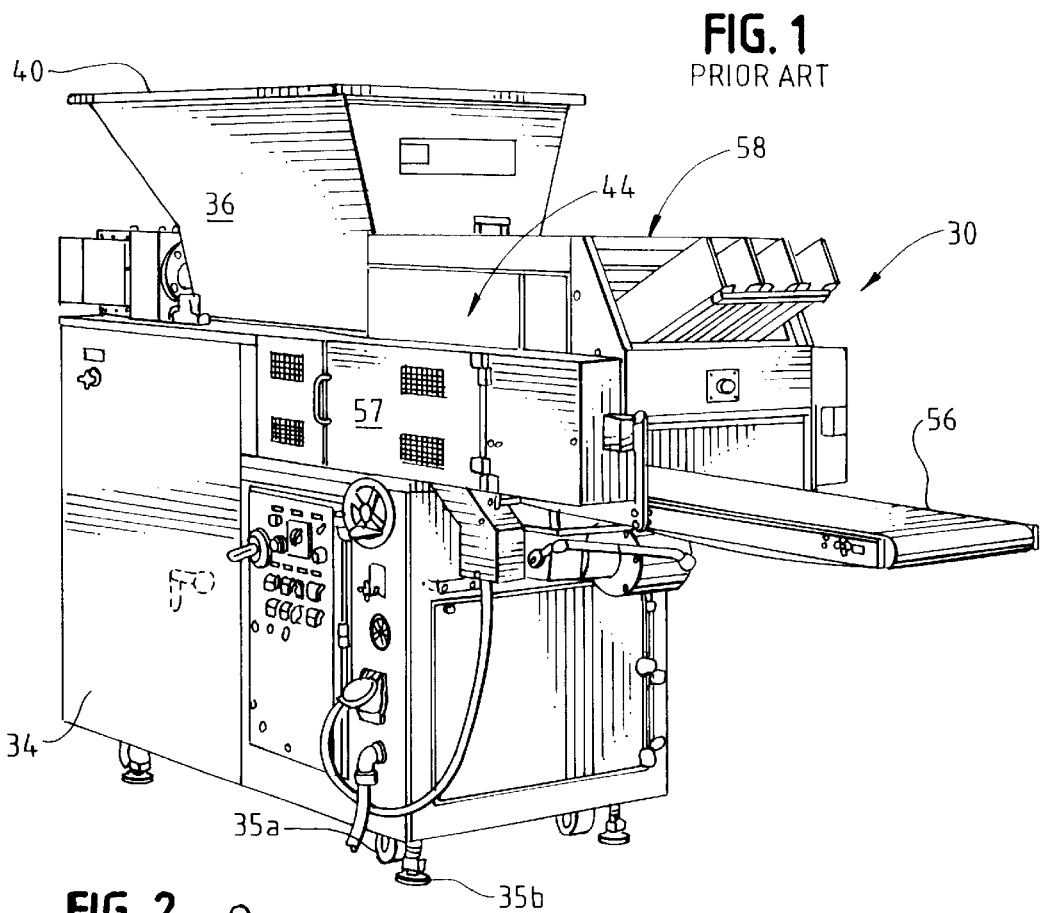
FIG. 1 is a perspective view of a prior art patty forming machine.
Figure 2:
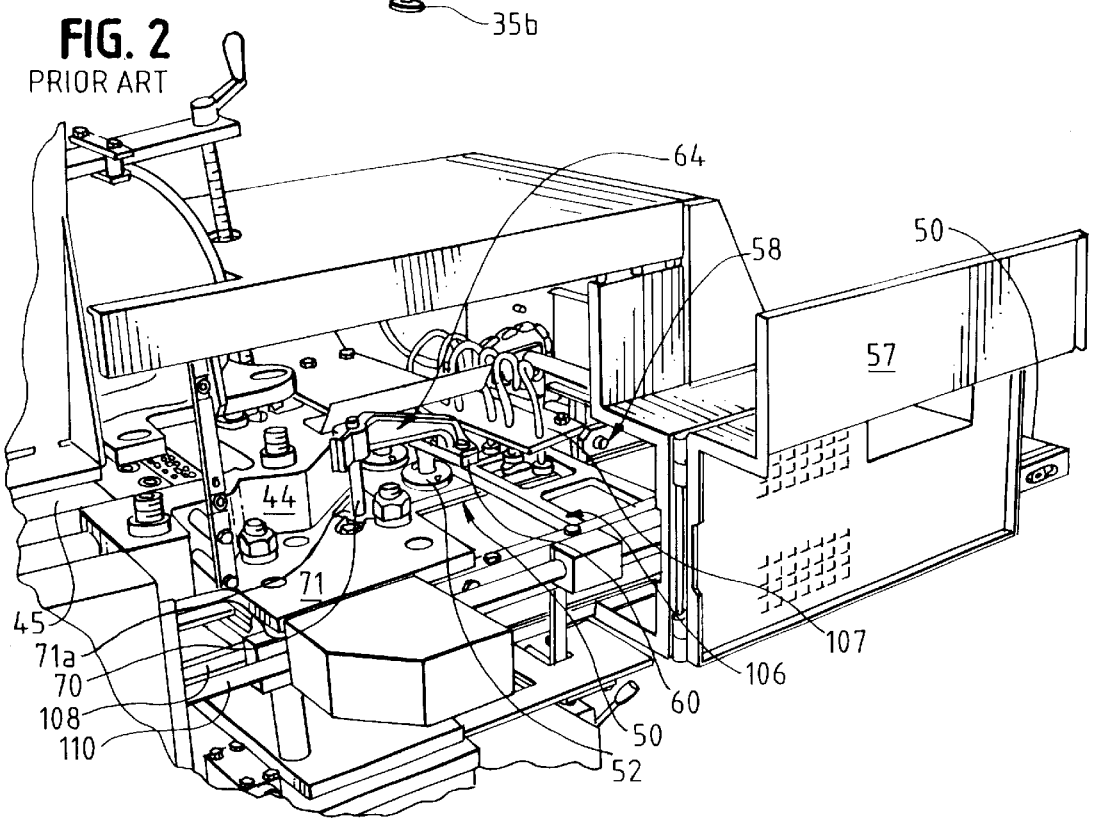
FIG. 2 is a fragmentary, enlarged perspective view of a portion of the machine shown in FIG. 1, with an access door opened to allow viewing inside the cabinetry.
Figure 3:
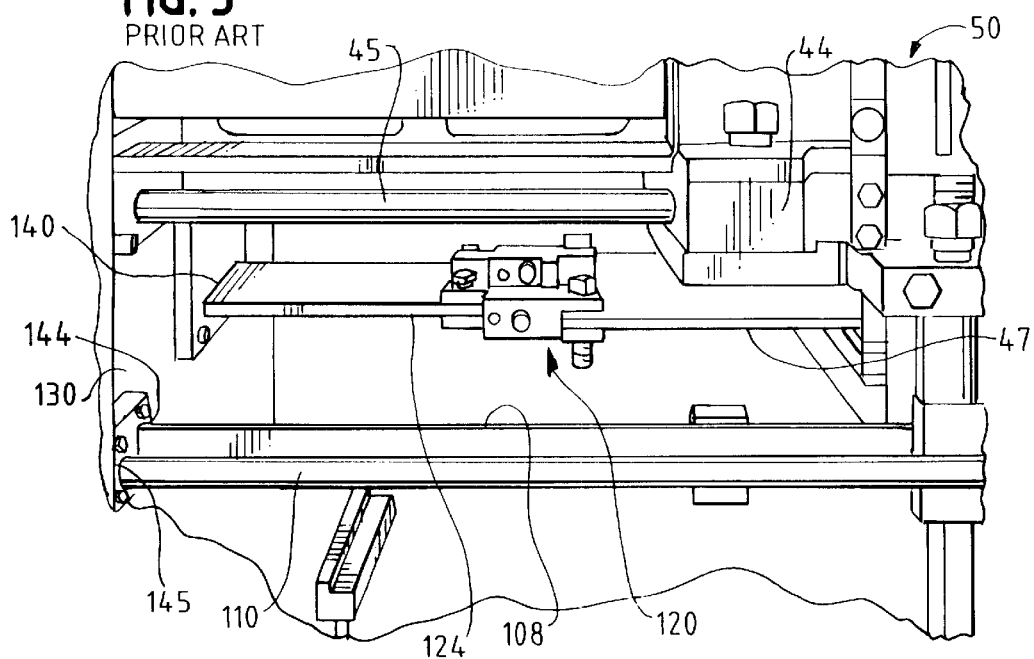
FIG. 3 is a fragmentary perspective view of a portion of the machine of FIG. 1 with cabinetry opened or removed to allow viewing of mechanical components.
Figure 4A:
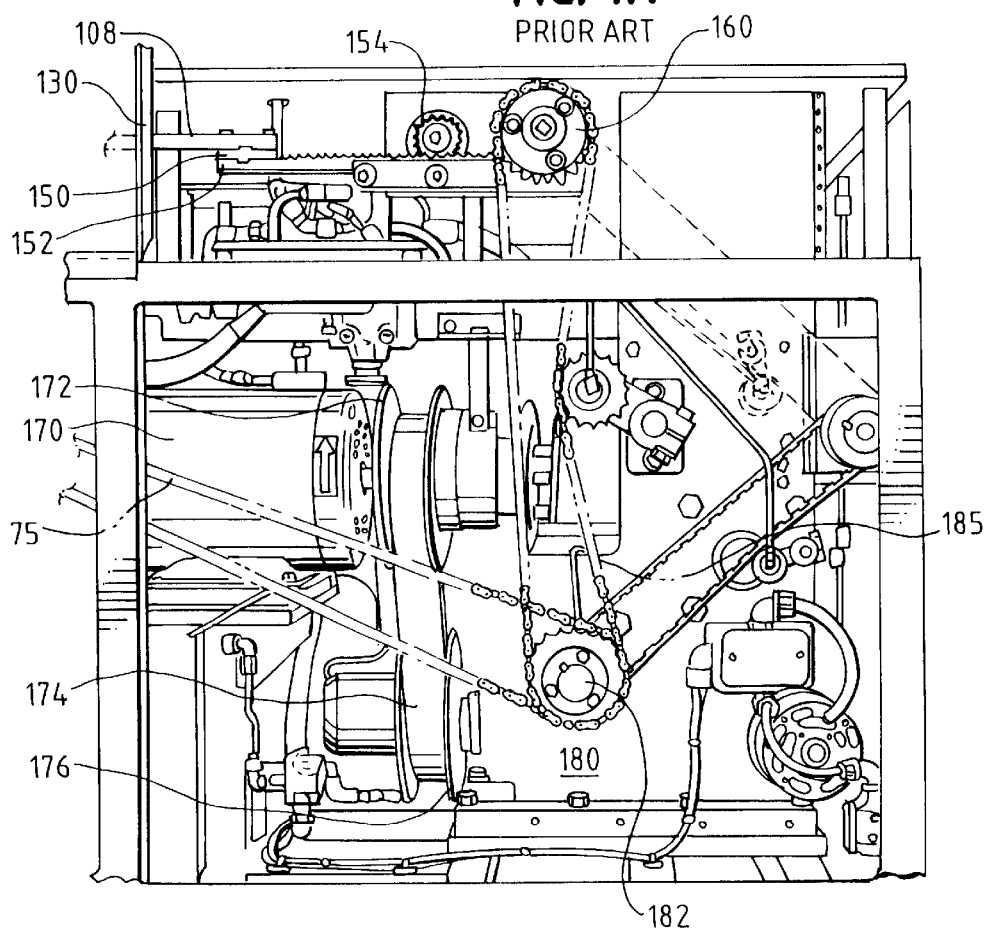
FIG. 4A is a fragmentary left side, rear elevational view of the machine shown in FIG. 1 with cabinetry removed to view the inside mechanical components.
Figure 4B:
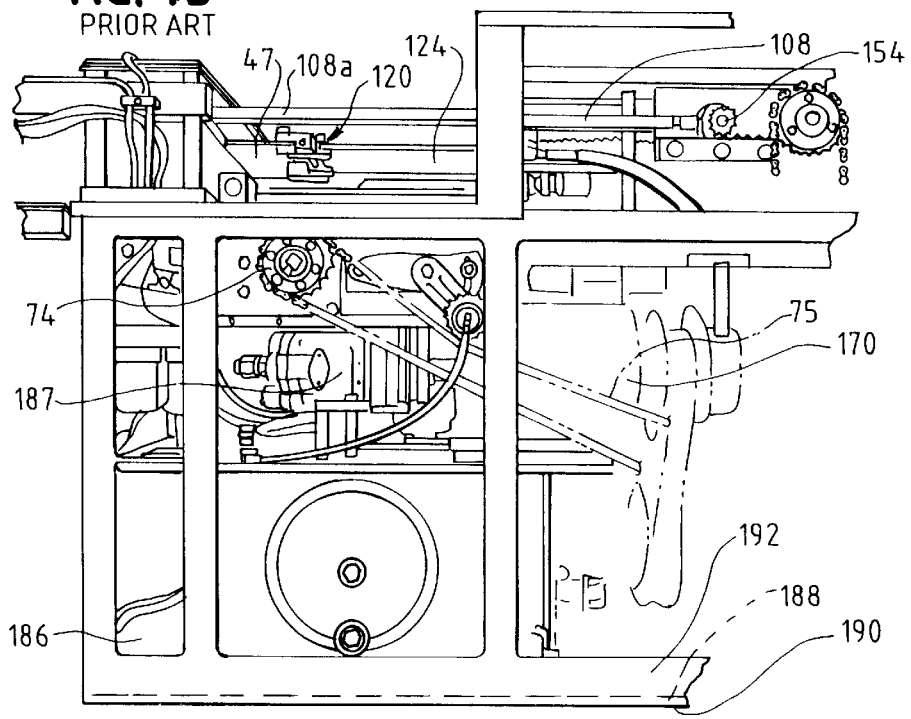
FIG. 4B is a fragmentary left side, front elevational view of the machine of FIG. 1 with cabinetry removed to view the internal mechanical components.
Figure 4C:
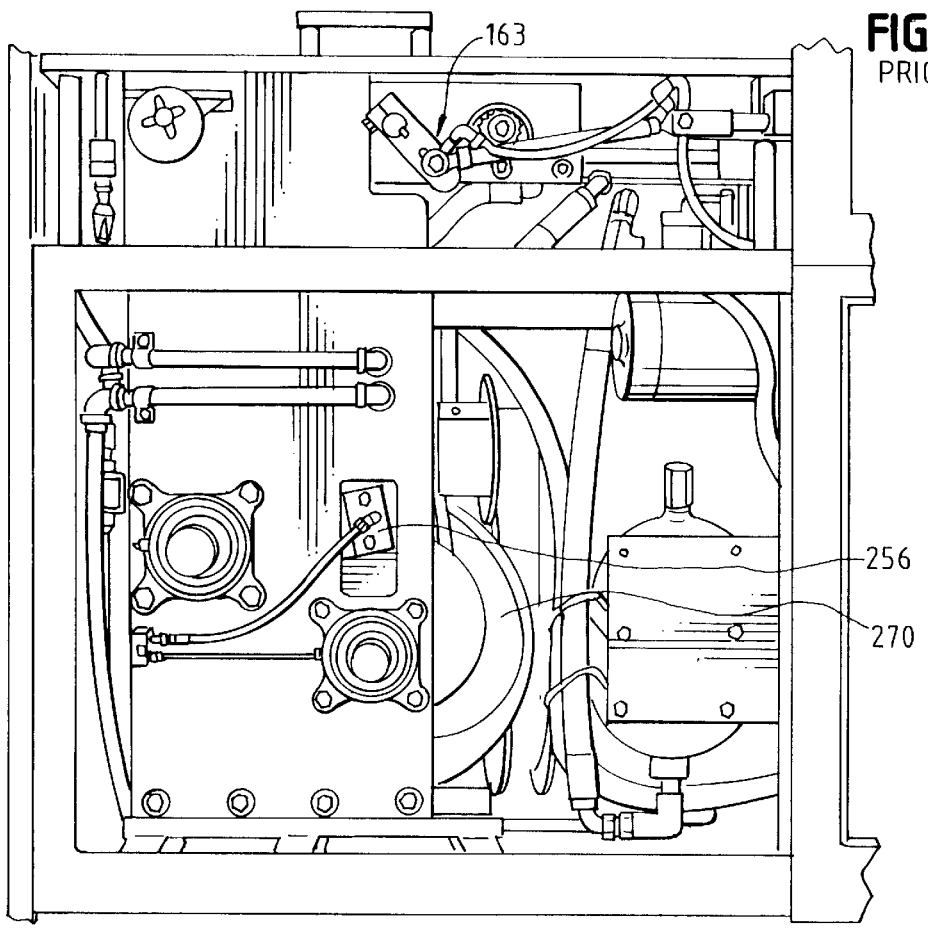
FIG. 4C is a fragmentary right side, rear elevational view of the machine of FIG. 1 with cabinetry either removed or opened to view the inside mechanical components.
Figure 4D:
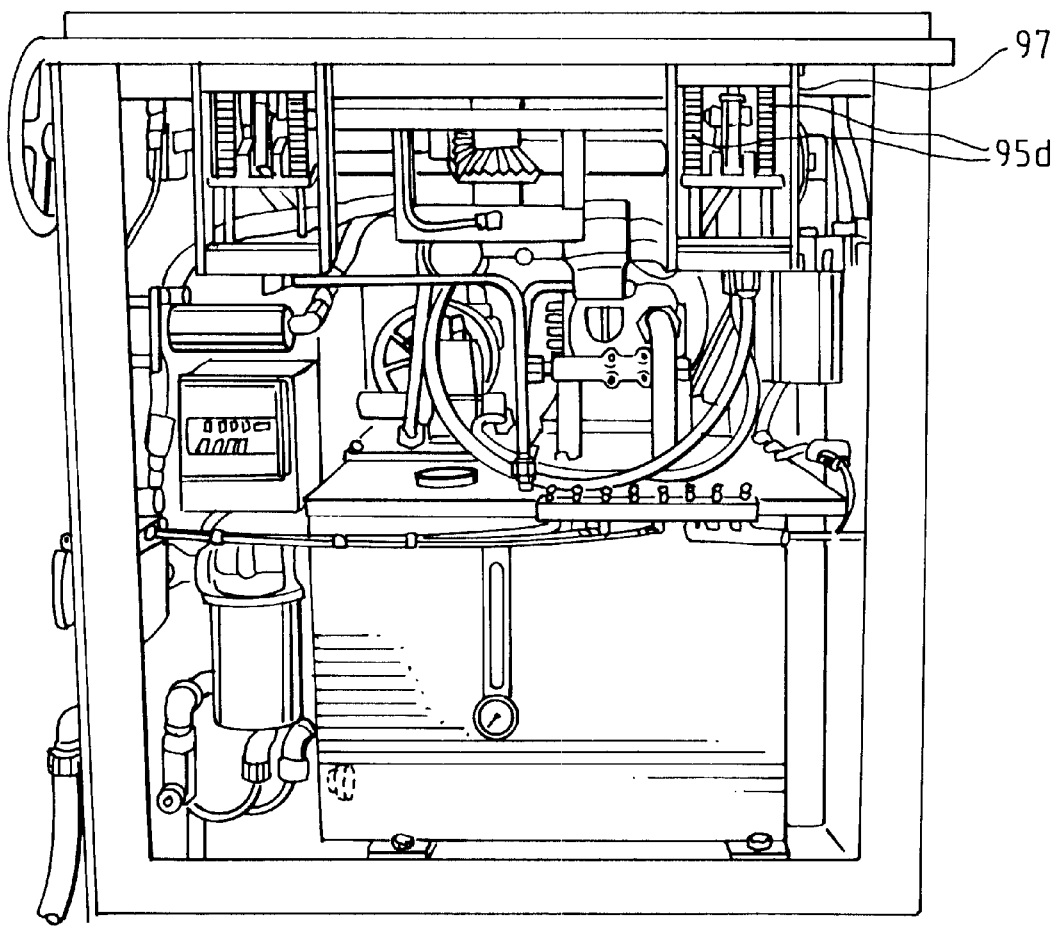
FIG. 4D is a fragmentary front end view of the machine of FIG. 1 with cabinetry removed to view inside mechanical components.
Figure 5:
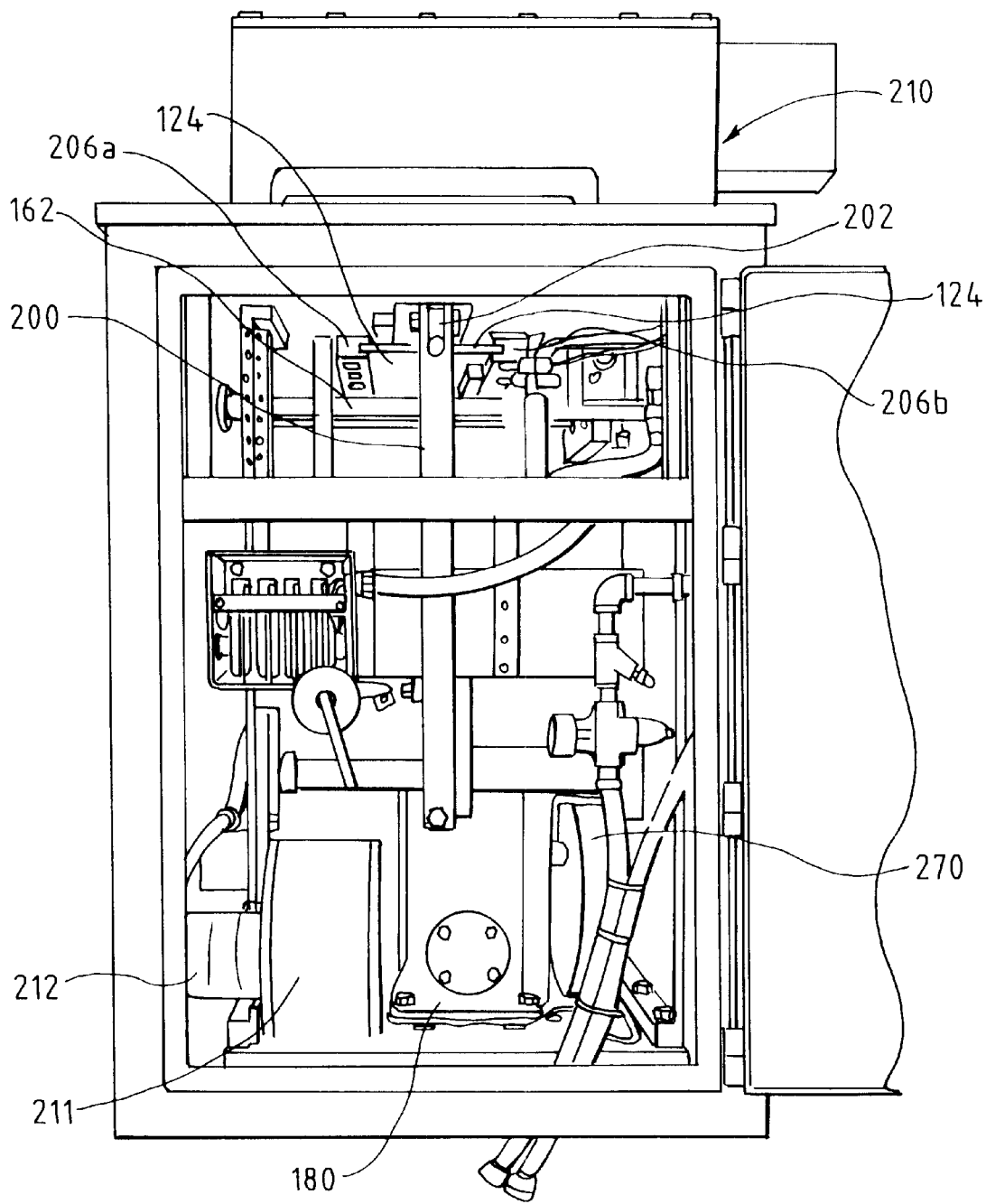
FIG. 5 is a fragmentary rear view of the machine of FIG. 1 with a rear door opened to view inside mechanical components.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

The present invention relates to a patty forming machine structured substantially as shown in FIGS. 1 through 8B but with some significant improvements.

Figure 6:
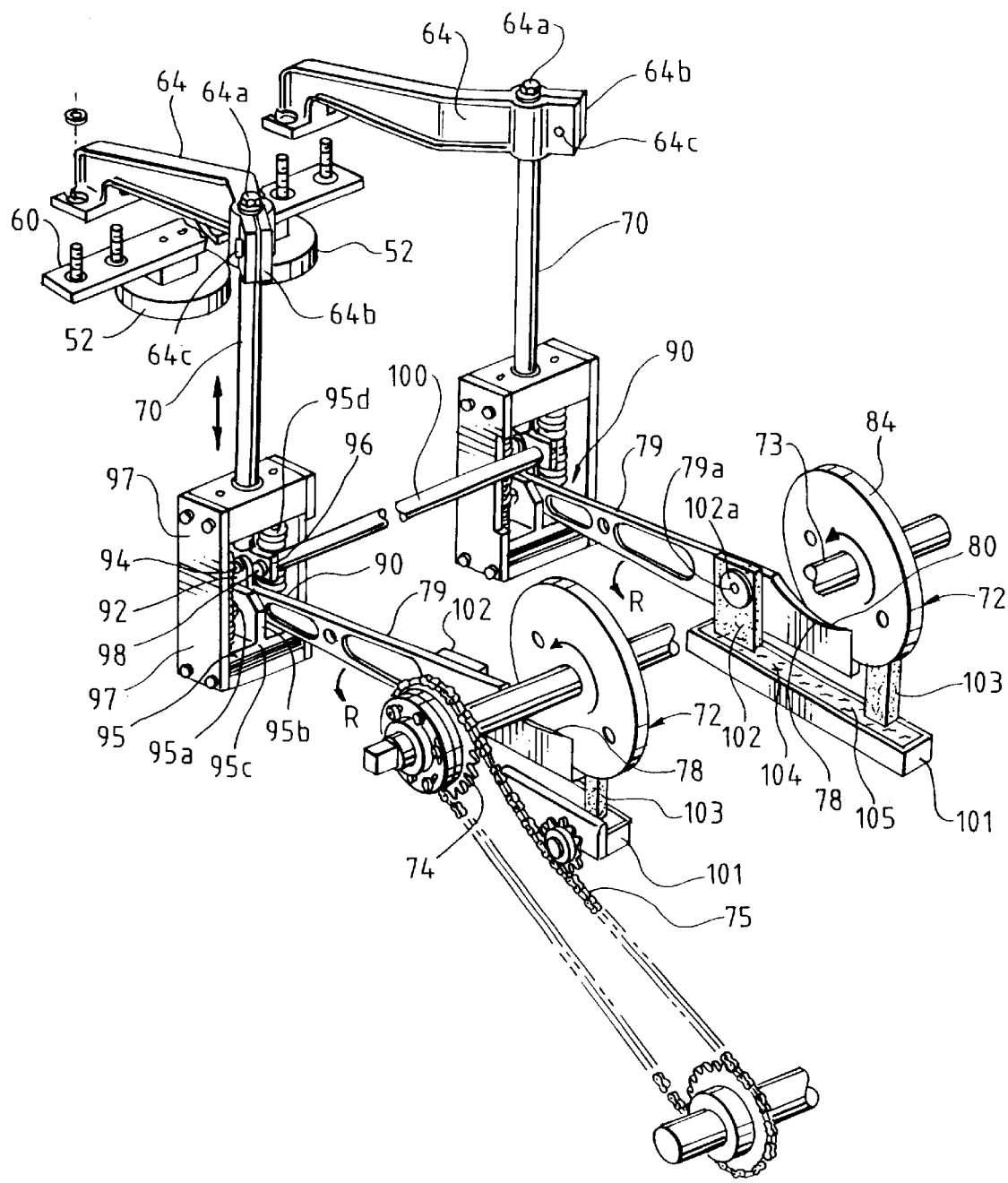
FIG. 6 is a partially exploded, fragmentary, enlarged perspective view of a patty knock-out system of the machine shown in FIG. 1, isolated from surrounding components for clarity.
Figure 7:
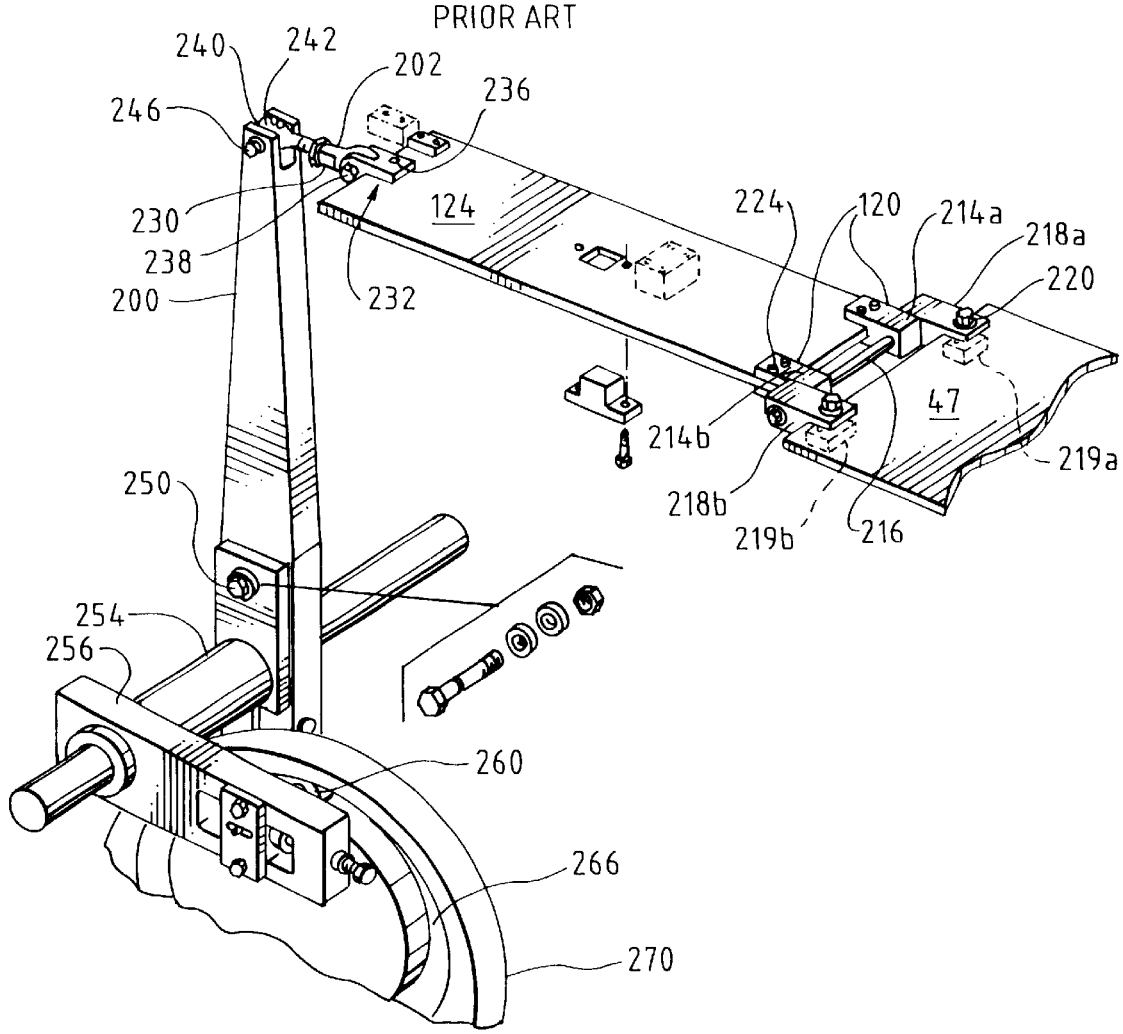
FIG. 7 is an enlarged, fragmentary, partially exploded, perspective view of a mold plate driving system from the machine shown in FIG. 1 viewed in isolation from surrounding components for clarity.
Figure 8A:
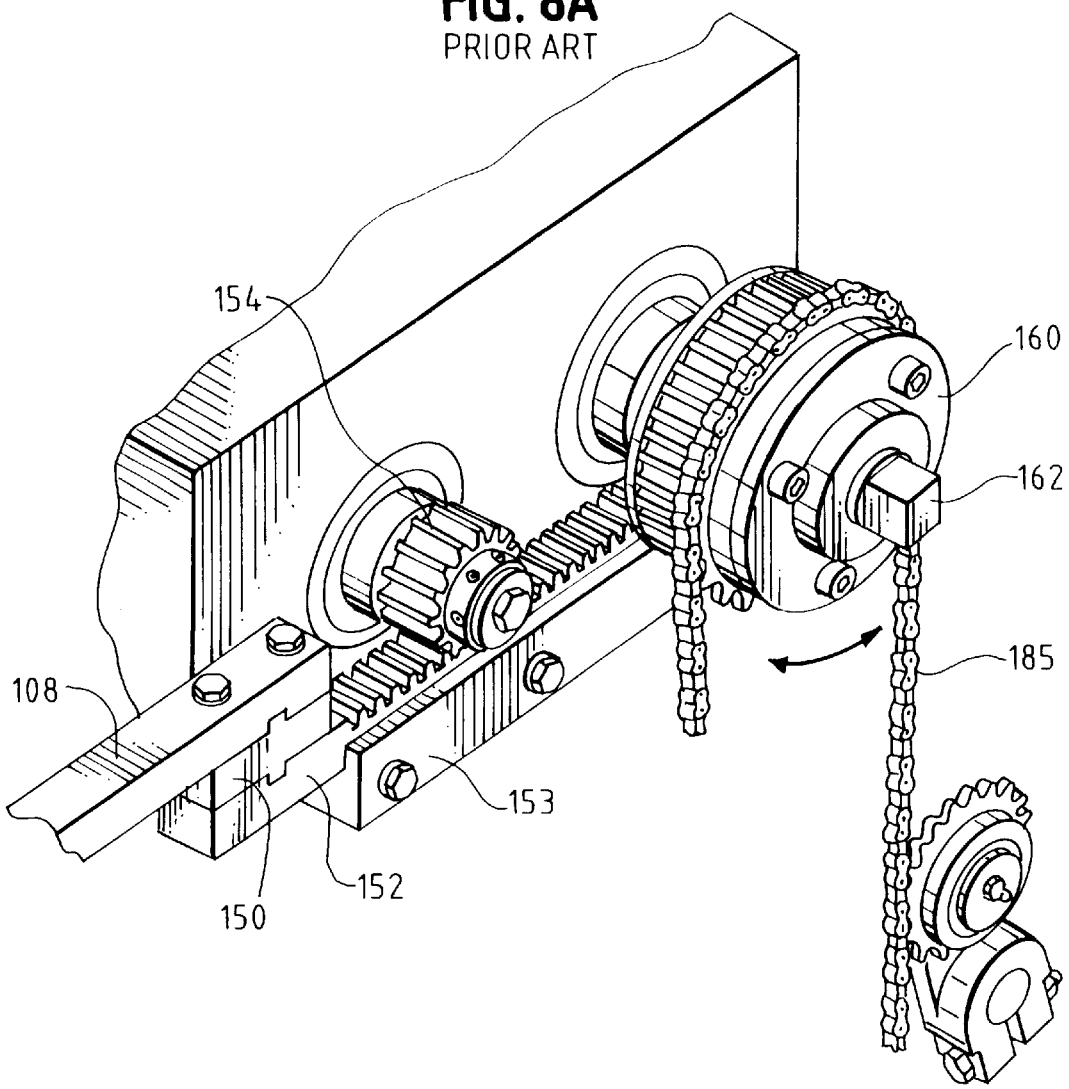
FIG. 8A is an enlarged, fragmentary, perspective view of a vacuum bar shuttle system from the machine in FIG. 1, shown in isolation from surrounding components for clarity.
Figure 8B:
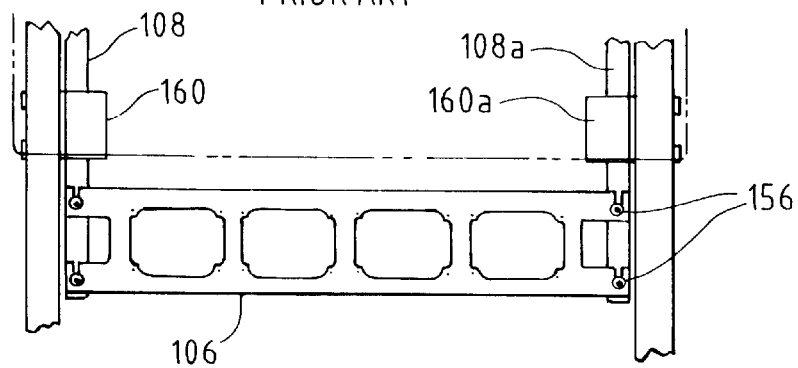
FIG. 8B is an enlarged fragmentary plan view of a vacuum bar connected to left and right vacuum bar shuttle arms, taken from the machine of FIG. 1, shown in isolation from surrounding components for clarity.

The present invention includes an improvement to the knock-out configuration of FIG. 6. The present invention also includes two cams, two knock-out arms, two knock-out rods, two knock-out bar arms, and two oiling systems in substantially the same general layout a shown in FIG. 6. The invention provides an improved tie bar connection detail, an improved knock-out rod and an improved knock-out rod support, and an improved oil reservoir, all as compared to that illustrated in FIG. 6.

Figure 9:
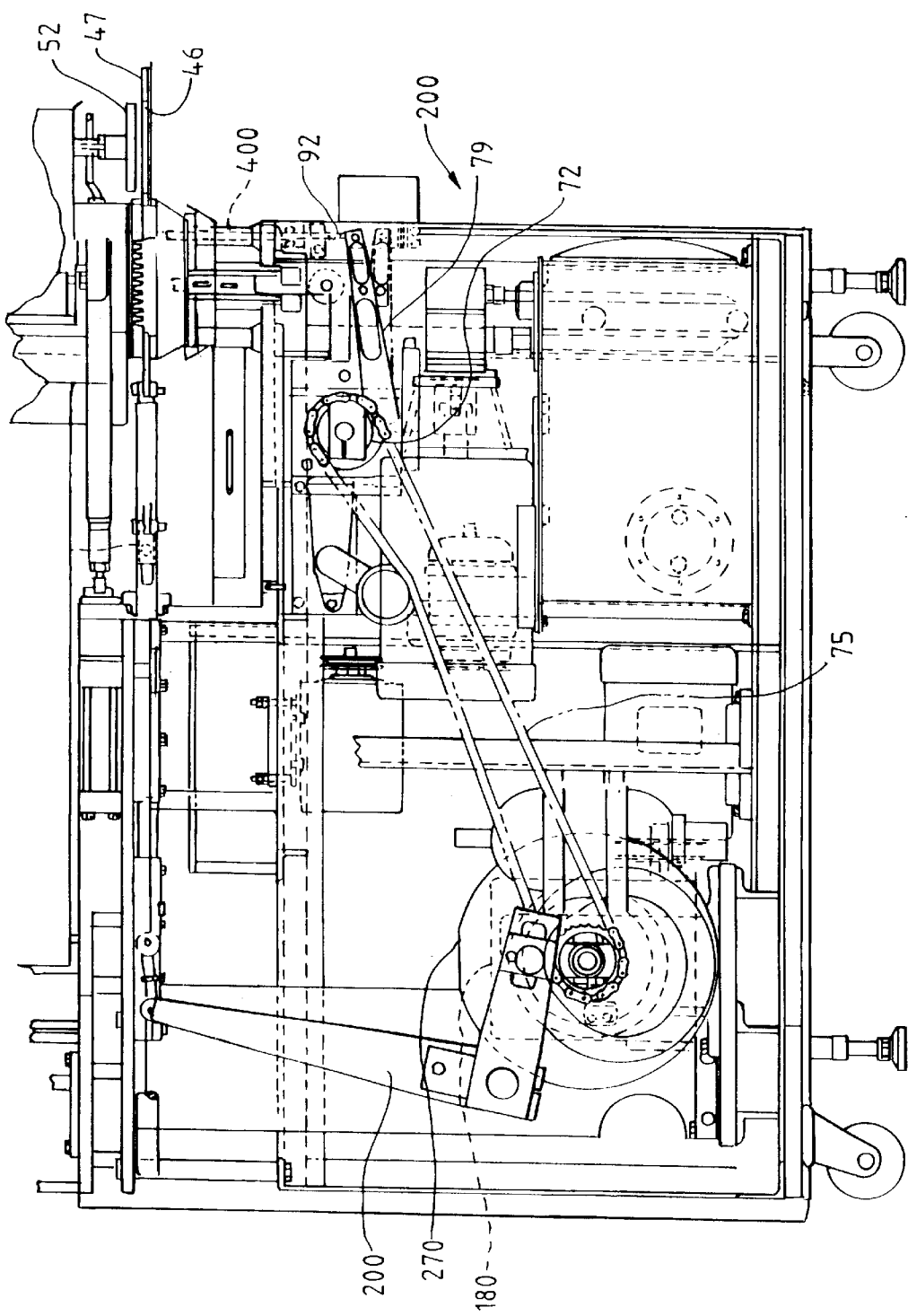
FIG. 9 is a fragmentary right side elevational view of a patty forming machine of the present invention.

FIG. 9 illustrates the knock-out arm 79 interacting with the cam 72 to be generally identical to that shown in FIG. 6. The cam is driven by the drive chain 75 which is driven by an output shaft from the drive reducer 180. The knock-out arm 79 is connected via the linkage 92 to a knock-out rod 400 of the present invention.

Figure 9A:
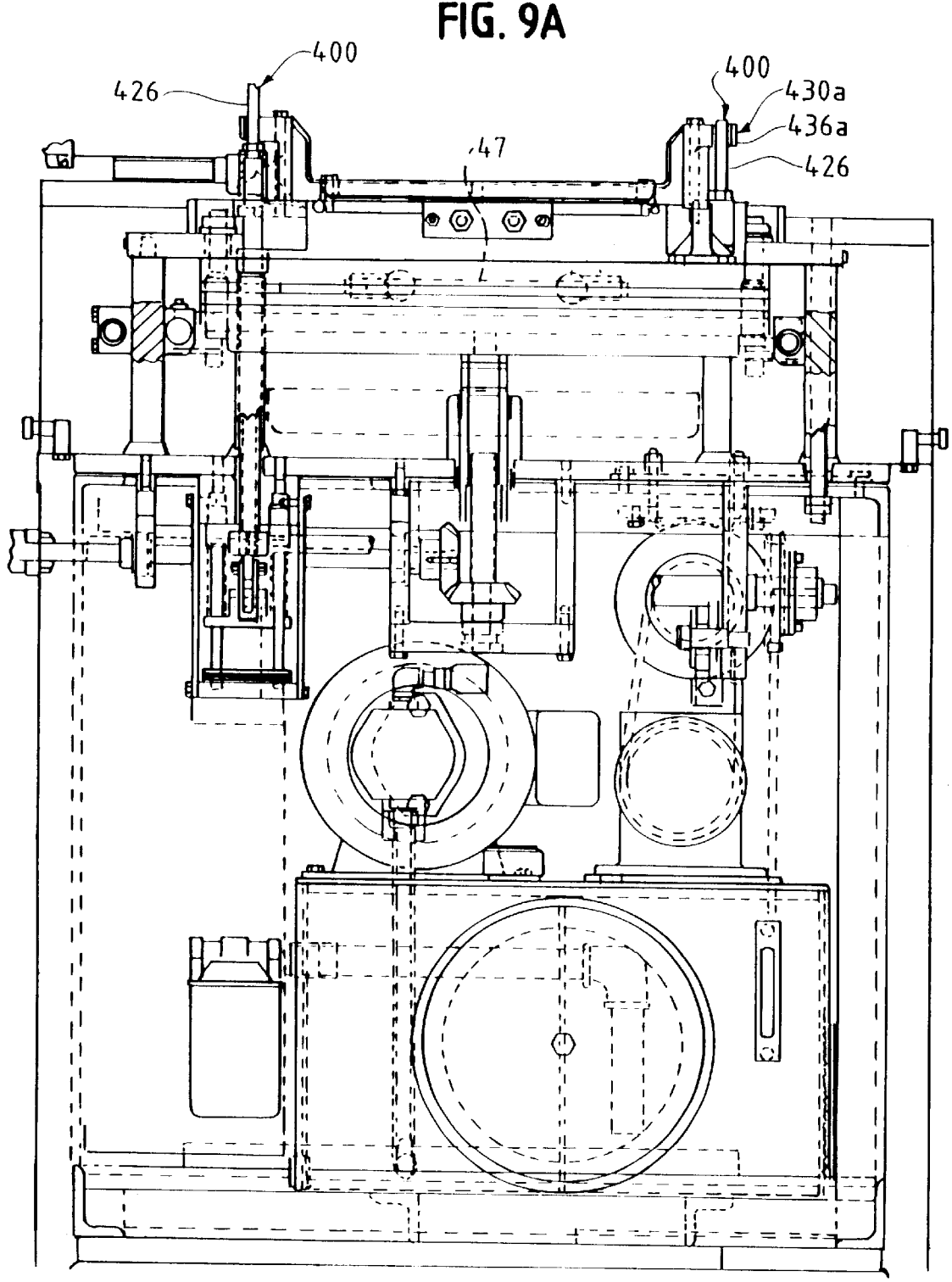
FIG. 9A is a front end view of the patty forming machine shown in FIG. 9.
Figure 11:
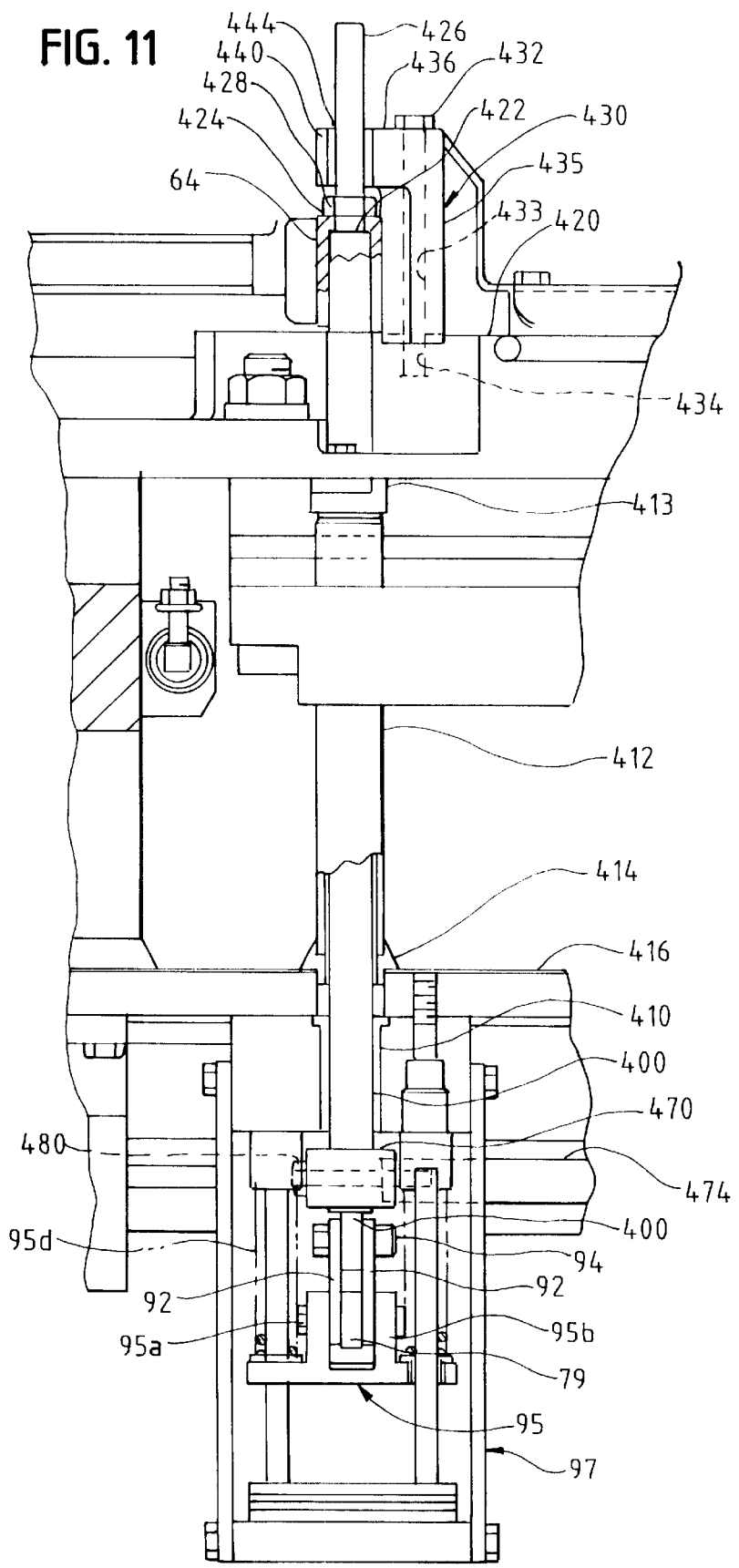
FIG. 11 is an enlarged fragmentary end view taken from FIG. 9A.

FIGS. 9A and 11 show the knock-out arm 79 which is connected by the fastener 95a to the linkage 92. The linkage 92 is in the form of dual linkage plates on opposite sides of the knock-out arm 79. The linkage 92 and knock-out arm 79 are fit between the vertical legs 95b and the fastener 95a connects the two vertical legs 95b, the two linkage plates 92 and the knock-out arm 79. The linkage plates 92 are further connected at an opposite end to the knock-out rod 400 using the fastener 94.

The rod 400 reciprocates within a stationary tubular guide or bushing 410. The rod is surrounded by a protective tube 412. The protective tube 412 also includes a beveled shoulder piece 414 adjacent an exposed surface 416 which prevents accumulation of debris or waste product into sharp comers or joints during spray cleaning of the apparatus. The beveled shoulder piece acts to deflect matter and water outwardly. An upper bushing or guide 413 guides an upper portion of the reciprocating rod 400.

The rod 400 extends upwardly to above a mold plate cover top surface 420. The knock-out bar arms 64, which are substantially identical to those shown in FIG. 6, are fit over the rod 400 and held down onto a shoulder 422 of the rod 400 by a nut 424. Unlike the rod shown in FIG. 6, the rod of the present invention includes an extension 426 above a threaded region 428.

An inverted L-shaped support bracket 430 is fastened to the mold cover support surface 420 by a fastener 432 fit through a bore 433 of a vertical leg 435 of the bracket. The fastener 432 is screwed into a threaded hole 434 of the mold cover. An overhanging portion 436 of the bracket 430 includes an aperture 440 holding a sleeve bearing 444 which receives the extension 426 of the rod 400. Thus, the rod extension 426 can slide vertically within the sleeve bearing 444.

A second support bracket 430a is provided at the respective opposite knock-out rod 400 fashioned in mirror image fashion, with the overhang portion 436a angled outwardly of the center line of the machine. It should also be noted that FIG. 9A shows the left knock-out rod 400 in a raised position and the right knock-out rod 400 in a lowered position. This would not be a preferred operating condition but is only shown to illustrate the varied movement of the extensions 426 of the two knock-out rods 400. In fact, the knock-out rods 400 move up and down together, evenly.

Figure 15:
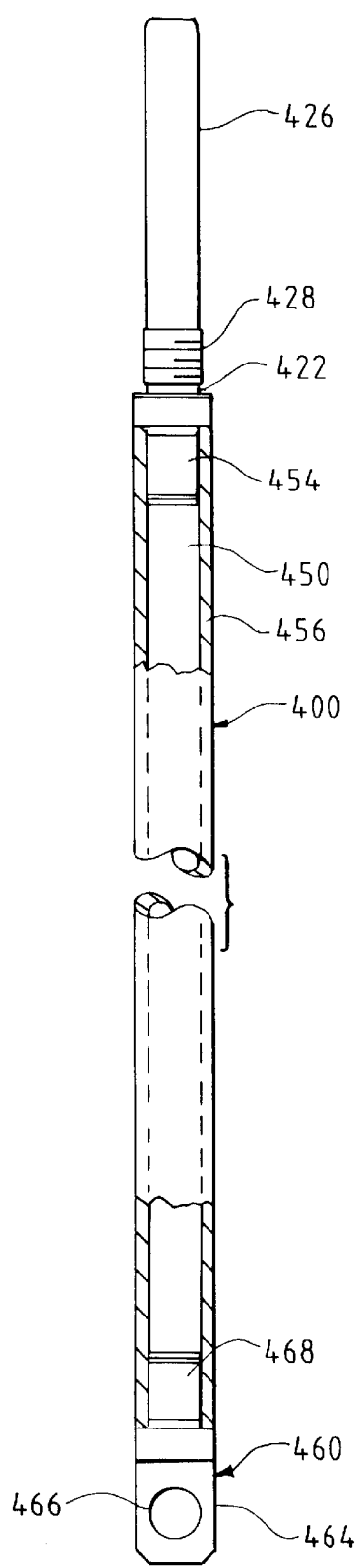
FIG. 15 is a side view of a knock-out rod shown in FIG. 9.
Figure 16:
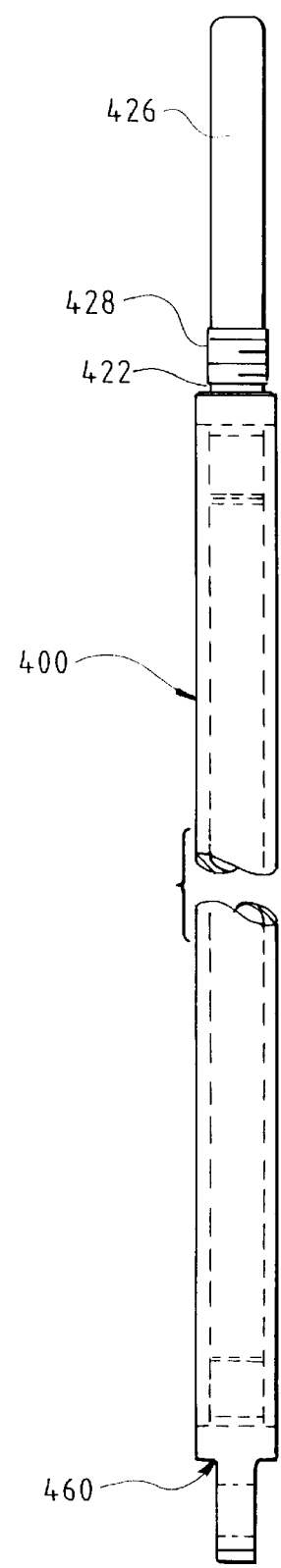
FIG. 16 is an end view of the knock-out rod shown in FIG. 15.

FIGS. 15 and 16 illustrate the structure of the knock-out rods according to the invention. The knock-out rods are in fact tubular having a hollow interior 450. The extension 426, the threaded region 428, the shoulder 422 and a plug portion 454, as a unitary structure, are inserted into an end of the knock-out rod tube 456, and welded thereto. At the bottom end of the knock-out rod a second unitary structure 460 includes a lug 464 with an aperture 466, the lug 464 extending in unitary fashion with a second plug 468 which is welded into an end of the tube 456.

Figure 10:
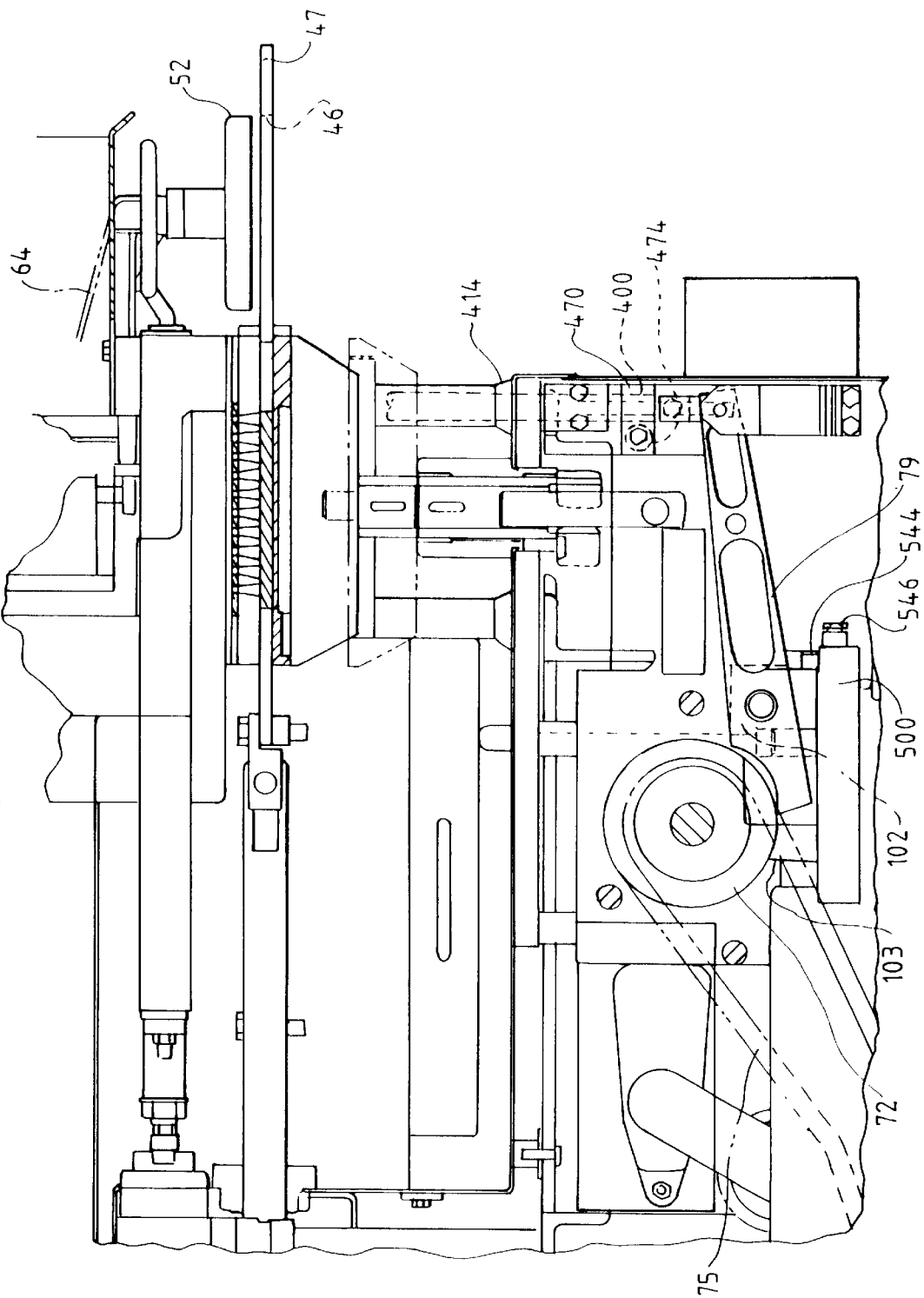
FIG. 10 is an enlarged fragmentary elevational view taken from FIG. 9.

FIG. 10 shows a clamp block or yoke 470 which clamps around the knock-out rod 400 and provides a connection for a spacer rod or a tie rod 474 which connects the two knock-out rods 400.

Figure 17:
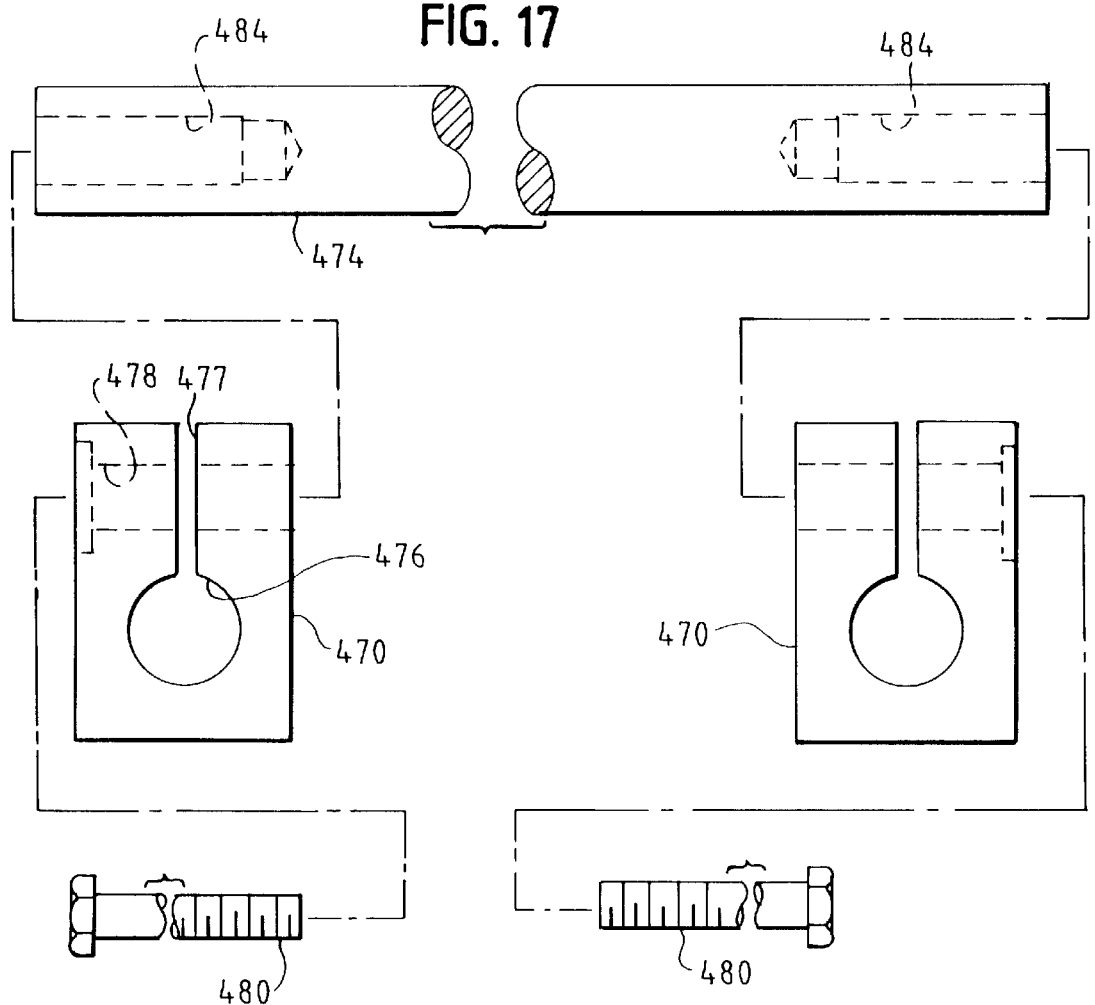
FIG. 17 is a plane view of a knock-out rod spacer assembly shown in FIG. 9.
Figure 18:
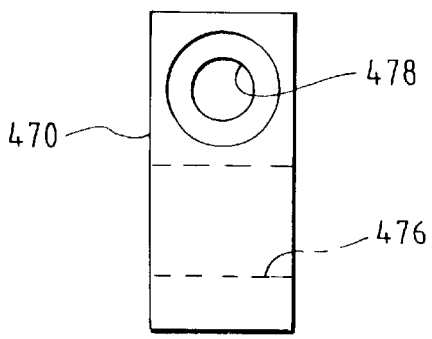
FIG. 18 is a left end view of the assembly shown in FIG. 17.

FIG. 17 shows this arrangement in more detail. The yoke 470 includes a central, generally circular aperture 476 for receiving the knock-out rod 400. The aperture 476 is open into a slot 477. A transverse bore 478 extends through a width of the yoke 470 including the slot 477. The bore is counter sunk for receiving a machine screw or bolt 480. The opposite side yoke 470 is arranged in a mirror image orientation. Between the yokes 470 is arranged a tie rod 474 which is substantially solid with threaded bores 484 at opposite ends for receiving the fasteners 480 to lock the yokes 470 to opposite ends of the tie rod 474. By tightening the fasteners 480 the yokes are clamped to the tie rod 400 due to the presence of the slot 477 which allows the aperture 476 to be drawn tight against the knock-out rods 400. Thus, the flag or tab 96 shown in FIG. 6 is eliminated and a more sturdy construction for the tie rod is provided, avoiding the potential fabrication problem of the flag 96 and the operational problem of the cracking of the flag 96 from the knock-out rod 70.

FIG. 10 illustrates a further improvement of the present invention over the prior art machine. Particularly, referring to FIG. 6, the oil pans 101 which include an open top 104 are prone to be contaminated or washed out by the entry of wash water during a cleaning operation into the oil 105. According to the present invention, substantially sealed oil containing reservoirs 500 are provided in substantially the same positions that the open top oil pans 101 are located in FIG. 6, relative to the cams 72 and the knock-out arms 79.

One of the reservoirs 500 is shown in detail in FIGS. 12 through 14. It should be noted that the reservoir for the right side of the machine is shown but that the reservoir for the left side would merely be a mirror image structure to that for the right side. FIG. 12 shows the reservoir including side walls 504, 505 a bottom wall 506, a top wall 508 and a side oil nozzle 510, which is typically a one quarter inch NPT half coupling, welded into an opening in an end wall 514 which faces toward the front of the machine for easy access and viewing of oil level. The opposite end wall is labeled 518 in the figure.

As shown in FIG. 14, the top wall 508 extends outwardly of the side wall 505 into a flange portion 520 having a plurality of screw receiving holes 522 for attaching the reservoir 500 to stationary structure of the machine.

As shown in FIG. 13 the top wall 508 includes a large rectangular opening 530 for the insertion of the wick 102 and a smaller rectangular opening 532 for the insertion of the wick 103. The function of the two wicks 102, 103 is explained with regard to FIG. 6. A further hole 534 is arranged adjacent to the nozzle 510 and functions as a fill port. In this regard an oil hole cover 544 can be pushed or threaded into the opening 534 for filling the reservoir 500 with oil. An oil hole cover is a short cylindrical tube with a spring loaded closed lid. A threaded viewing gauge 546 is used to plug the side oil nozzle 510. The nozzle 510 being open on a side of the reservoir can be used to check proper level within the reservoir.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. A patty forming machine, comprising;
   a support frame;
   a mold plate driven to reciprocate along a first direction relative to said support structure and having at least one cavity for receiving food product to be molded into a patty;
   a knock-out cup arranged for reciprocation along a second direction relative to said support structure and aligned for repetitively pushing successive patties out of said cavity; and
   at least one elongated knock-out rod arranged substantially along said second direction having a base end driven to reciprocate along said second direction, and a distal end;
   a guide;
   a knock-out bar arm having a base end and a distal end, said base end of said knock-out bar arm connected to a first position on said knock-out rod and extending substantially perpendicularly from said knock-out rod to said distal end of said knock-out bar arm;
   wherein said knock-out cup is operatively connected to said knock-out bar arm at said distal end of said knock-out bar arm and said knock-out rod is guided for sliding movement by said guide located at a second position on said rod, said second position located between said first position and said distal end of said rod; and
   wherein said guide comprises an inverted L-shaped member having a guide hole through its horizontal leg for guiding said knock-out rod and an attachment bore through its vertical leg for receiving a fastener to fasten the guide to the support structure.

2. The machine according to claim 1, wherein said knock-out cup is one of a plurality of knock-out cups; and
   comprising a knock-out bar, said cups mounted to said bar to conjointly reciprocate with said bar;
   wherein said knock-out bar arm is one of a pair of knock-out bar arms connected to said knock-out bar at distal ends of said knock-out bar arms;
   wherein said knock-out rod is one of a pair of knock-out rods having base ends which are driven into reciprocation and which are operatively connected at respective first positions on said rods to base ends of said knock-out bar arms, and which rods are both guided for eliding movement at second positions between respective first positions and respective distal ends of said rods.

3. The machine according to claim 2, comprising a tie rod and a pair of clamp blocks, wherein said knock-out rods are connected together by said tie rod, said tie rod being fastened to said clamp blocks, each of said clamp blocks clamped to one of said knock-out rods.

4. A patty forming machine, comprising:
   a support frame;
   a mold plate driven to reciprocate along a first direction with respect to said support structure and having at least one cavity for receiving food product to be molded into a patty;

a knock-out cup arranged for reciprocation along a second direction with respect to said support structure and aligned for repetitively pushing successive patties out of said cavity; and at least one knock-out rod having a base end driven to reciprocate along said second direction, and a distal end;

a guide;

wherein said knock-out cup is operatively connected to said knock-out rod at a first position on said knock-out rod, and said knock-out rod is guided for sliding movement by said guide located at a second position on said rod, said second position located between said first position and said distal end of said rod; and a knock-out arm, a rotating cam having a cam surface, an oil reservoir, a first wick and a second wick, wherein said knock-out rod is reciprocated by said knock-out arm which is pivoted reciprocally about a pivoting connection to said support frame by sliding contact force from a cam surface of said rotating cam, and said oil reservoir is located adjacent to said cam and to said pivoting connection, said oil reservoir being substantially closed on a top side thereof to prevent contamination, said first wick extending from said pivoting connection into said oil reservoir to supply oil to said pivoting connection, and said second wick extends from said cam surface into said oil reservoir to provide oil to said cam surface.

5. The machine according to claim 4 comprising an oil level check nozzle penetrating through a side wall of said oil reservoir.

6. The machine according to claim 1, wherein said arm is clamped to said knock-out rod at one end thereof and extends horizontally therefrom.

7. The machine according to claim 2, wherein each arm of said pair of knock-out bar arms extends from one knock-out rod and is clamped at a base end thereto.

8. A patty forming machine, comprising:

a machine structure;

a reciprocating mold plate having at least one cavity for receiving food product to be formed into a patty;

a reciprocating knock-out cup arranged for pushing a patty out of said cavity;

a knock-out arm pivotally mounted to said machine structure at a pivoting connection, and operatively connected to said knock-out cup to drive the knock-out cup into reciprocation;

a cam rotatably mounted to said machine structure and driven in rotation, said cam having a cam surface, said knock-out arm pivoted reciprocally by sliding contact force from said cam surface of said rotating cam;

an oil reservoir carried by said machine structure and having a top wall, said oil reservoir being substantially closed by said top wall to prevent contamination of oil within said reservoir;

a first wick and a second wick, said first wick extending from said oil reservoir to said knock-out arm to supply oil to said pivoting connection, and said second wick extending from said reservoir to said cam surface to supply oil to said cam surface, said top wall having wick openings which closely conform to the cross-section of said first and second wicks respectively, said first and second wicks penetrating into said reservoir through said wick openings of said oil reservoir top wall.

9. The machine according to claim 8 comprising an oil level check nozzle penetrating through a side wall of said oil reservoir.

10. The machine according to claim 8 comprising a knock-out rod, and a horizontally extending arm, said knock-out rod is arranged vertically and is connected to said cup via said horizontally extending arm, said knock-out arm is connected to said knock-out rod, pivoting reciprocation of said knock-out arm vertically reciprocates said knock-out rod.

11. A patty forming machine, comprising:

a machine frame;

a mold plate having cavities for receiving food product to be molded into patties, said mold plate mounted for reciprocation with respect to said machine frame;

a plurality of knock-out cups arranged to reciprocate into said cavities to dislodge patties from said cavities;

a bar extending horizontally and operatively connected to said knock-out cups;

a pair of knock-out rods arranged to reciprocate together vertically, said rods each operatively connected to said bar;

a tie rod and a pair of clamp blocks, said clamp blocks each attached to said tie rod at opposite ends thereof, said clamp blocks each clamped to one of said knock-out rods;

a pair of knock-out arms and a pair of rotating cams each having a cam surface, a pair of oil reservoirs, a pair of first wicks and a pair of second wicks, wherein said knock-out rods are reciprocated by said knock-out arms which are pivoted reciprocally by sliding contact force from cam surfaces of said rotating cams, and said oil reservoirs are substantially closed by a top wall thereof to prevent contamination, said first wicks each extending from said pivoting connection into said oil reservoir to supply oil to said pivoting connection, and said second wicks each extending from said cam surface into said oil reservoir to provide oil to said cam surface.

12. The machine according to claim 11 wherein said knock-out rods are connected to said bar by a pair of knock-out bar arms, and each knock-out rod is guided for vertical reciprocation by a guide, that comprises an inverted L-shaped member having a guide hole through its horizontal leg for guiding said knock-out rod and an attachment bore through its vertical leg for receiving a fastener to fasten the guide to the support structure.

13. A patty forming machine, comprising:

a machine structure;

a reciprocating mold plate having at least one cavity for receiving food product to be formed into a patty;

a reciprocating knock-out cup arranged for pushing a patty out of said cavity;

a knock-out arm pivotally mounted with respect to said machine structure at a pivoting connection, and operatively connected to said knock-out cup to drive the knock-out cup into reciprocation;

a cam rotatably mounted with respect to said machine structure and driven in rotation, said cam having a cam surface, said knock-out arm pivoted reciprocally by sliding contact force from said cam surface of said rotating cam;

an oil reservoir carried by said machine structure and having an enclosing wall to prevent contamination, said wall having a first wick opening;

a first wick, said first wick extending from said oil reservoir to said cam surface to supply oil to said cam surface, said first wick penetrating into said reservoir through said first wick opening, said first wick opening closely conforming to a cross section of said first wick.

14. The machine according to claim 13, comprising a second wick, and said enclosing wall including a second wick opening, said second wick extending from said oil reservoir to said pivoting connection to supply oil to said pivoting connection, said second wick penetrating into said reservoir through said second wick opening, said second wick opening closely conforming to a cross section of said second wick.

15. The machine according to claim 1, wherein said support frame includes a second guide having a bore for receiving and guiding said knock-out rod, said second guide located between said first position and said base end of said knock-out rod.

16. The machine according to claim 1, wherein said first direction is the horizontal direction and said second direction Is the vertical direction.

17. The machine according to claim 2, comprising a pair of cams rotatably mounted on said support frame, each of said cams operatively engaged to a respective one of said knock-out rods, rotation of said cams driving said knock-out rods into vertical reciprocation.

* * * * *

UNITED STATES PATENT AND TRADEMARK OFFICE
CERTIFICATE OF CORRECTION

PATENT NO.    : 6,368,092 B1                                Page 1 of 1
DATED         : April 9, 2002
INVENTOR(S)   : Lindee et al.

It is certified that error appears in the above-identified patent and that said Letters Patent is hereby corrected as shown below:

Column 8,
Line 31, replace "bar arm and" with -- bar arm, and --.
Line 54, replace "eliding" with -- sliding --.

Signed and Sealed this

Eighteenth Day of June, 2002

Attest:

Attesting Officer

JAMES E. ROGAN
Director of the United States Patent and Trademark Office